Feb. 6, 1962
G. E. HENNING
3,020,248
METHOD OF MAKING EXPANDABLE PLASTIC AND PREPARATION
OF CELLULAR PLASTIC THEREFROM
Filed Dec. 29, 1955
4 Sheets-Sheet 1
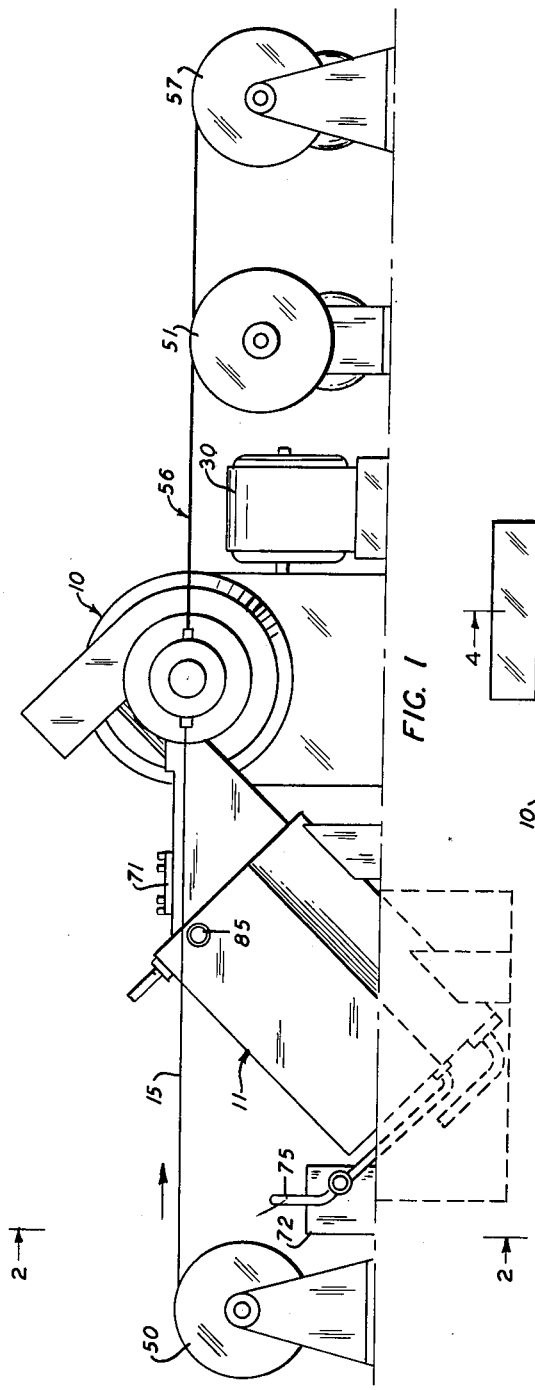
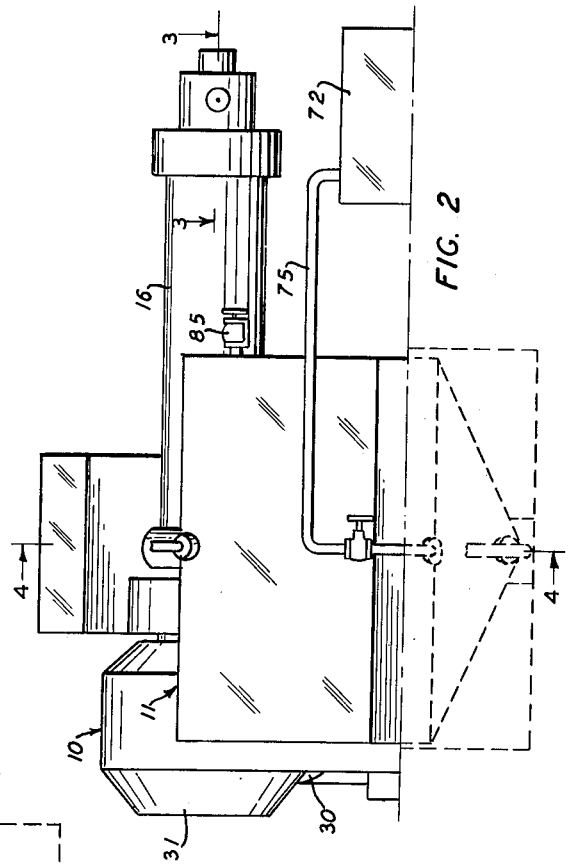
INVENTOR.
G. E. HENNING
BY
ATTORNEY

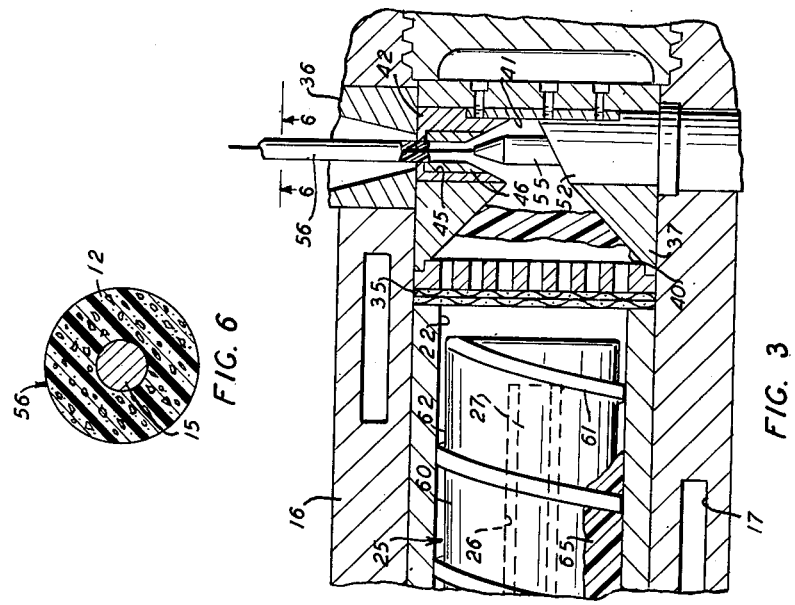
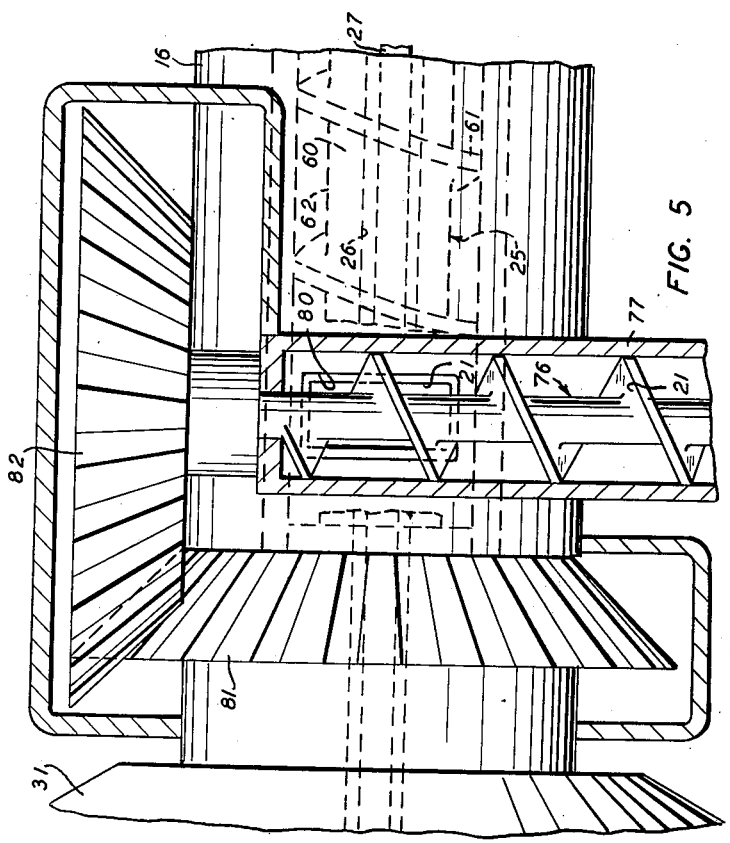

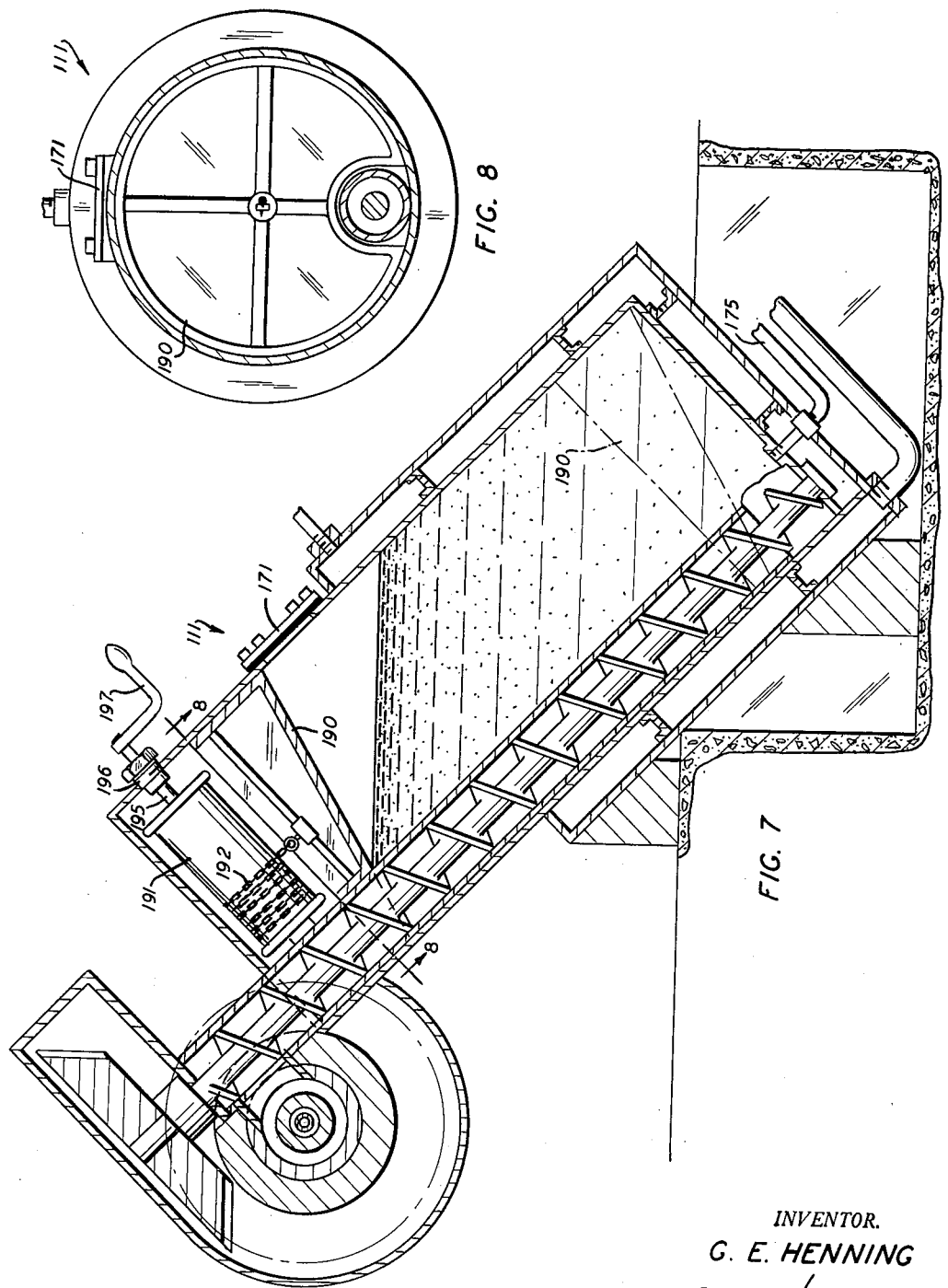

3,020,248
METHOD OF MAKING EXPANDABLE PLASTIC AND PREPARATION OF CELLULAR PLASTIC THEREFROM
George E. Henning, Baltimore, Md., assignor to Western Electric Company, Incorporated, New York, N.Y., a corporation of New York
Filed Dec. 29, 1955, Ser. No. 556,331
4 Claims. (Cl. 260—2.5)

This invention relates to methods of absorbing expanding media into thermoplastic materials preliminary to extrusion into cellular plastic products, and more particularly to methods of absorbing a liquefied, normally-gaseous expanding medium in a thermoplastic material, and extruding the resulting mass into an article having an expanded form.

The invention is especially directed to methods of absorbing a predetermined amount of a liquefied, normally-gaseous expanding medium into granules of an extrudable thermoplastic resin having a specific gravity lower than that of the liquefied expanding medium and then feeding the treated granules to an extrusion process of the type wherein they are first fluidized and then extruded into cellular form.

Heretofore, in the manufacture of insulated conductors, thermoplastic materials, such as polyvinyl halide compounds, nylon, polyethylene, or the like, have been extruded as solid coverings upon continuous conductors of indefinite length. For some purposes, it is desirable to manufacture insulated conductors having insulating coverings which include or consist of organic plastic materials in an expanded, cellular state. Conductors insulated in this manner are extremely useful for communication purposes, and are especially useful as components of telephone cables, video cables, and the like.

It has been suggested heretofore to introduce a gaseous material into a plastic, such as polystyrene, and to extrude the resulting mixture in a cellular state in the form of thick logs, or similar shapes. However, the methods and apparatus heretofore known for extruding organic plastic materials in such shapes are not satisfactory for extruding such materials upon conductors in the form of insulating coverings having cellular structures because the dimensions of the extruded products heretofore made and the uniformity, size and discreteness of the cells found in such products have not been critical factors. It is essential that insulating coverings for electrical conductors made of cellular plastics be of uniform diameter, be concentric with the conductors covered thereby, and have a multitude of small, discrete cells distributed uniformly throughout the bodies of plastic materials forming the coverings.

An object of the invention is to provide new and improved methods of absorbing expanding media into thermoplastic materials preliminary to extrusion into cellular plastic products.

A further object of the invention is to provide new and improved methods of absorbing a liquefied, normally-gaseous expanding medium in a thermoplastic material, and extruding the resulting mass into an article having an expanded form.

Another object of the invention is to provide new and improved methods of absorbing a predetermined amount of a liquefied, normally-gaseous expanding medium into granules of an extrudable thermoplastic resin having a specific gravity lower than that of the liquefied expanding medium and then feeding the treated granules to an extrusion process of the type wherein they are first fluidized and then extruded into cellular form.

Still another object of the invention is to provide new and improved methods of forming insulating coverings of expanded, cellular plastic materials upon electrical conductors.

A method, illustrating certain features of the invention, may include the steps of immersing a body of granules of an extrudable thermoplastic resin in a pool of a liquefied, normally-gaseous expanding medium having a specific gravity greater than that of the resin, so that the body of the granules contacts the bottom of the pool and does not float therein. The granules are soaked in this position for a predetermined time at a predetermined temperature so that a desired amount of the liquid is absorbed into the solid granules. Then, a stream of the treated granules is withdrawn from the bottom of the pool and fed to an extrusion process without intermediate exposure to the atmosphere. During the entire withdrawing step, the remaining body of granules is maintained immersed in the remaining liquid and in contact with the bottom of the pool for withdrawal therefrom.

A complete understanding of the invention may be obtained from the following detailed description of methods forming specific embodiments thereof, when read in conjunction with the appended drawings, in which:

FIG. 1 is a side elevation of apparatus by means of which methods embodying the invention may be practiced;

FIG. 2 is an elevation of an extruder forming part of the apparatus shown in FIG. 1, as viewed from the left hand side in that figure from line 2—2 thereof;

FIG. 3 is an enlarged, fragmentary, horizontal section taken along line 3—3 of FIG. 2;

FIG. 5 is an enlarged, fragmentary section taken along line 5—5 of FIG. 4;

FIG. 6 is an enlarged, transerse section taken along line 6—6 of FIG. 3, and showing in cross section a conductor insulated with an expanded plastic, such as is produced by means of methods embodying the invention;

FIG. 7 is a vertical section similar to the section shown in FIG. 4 showing an alternative embodiment of the invention, and FIG. 8 is a section taken along line 8—8 of FIG. 7.

Figure 4:
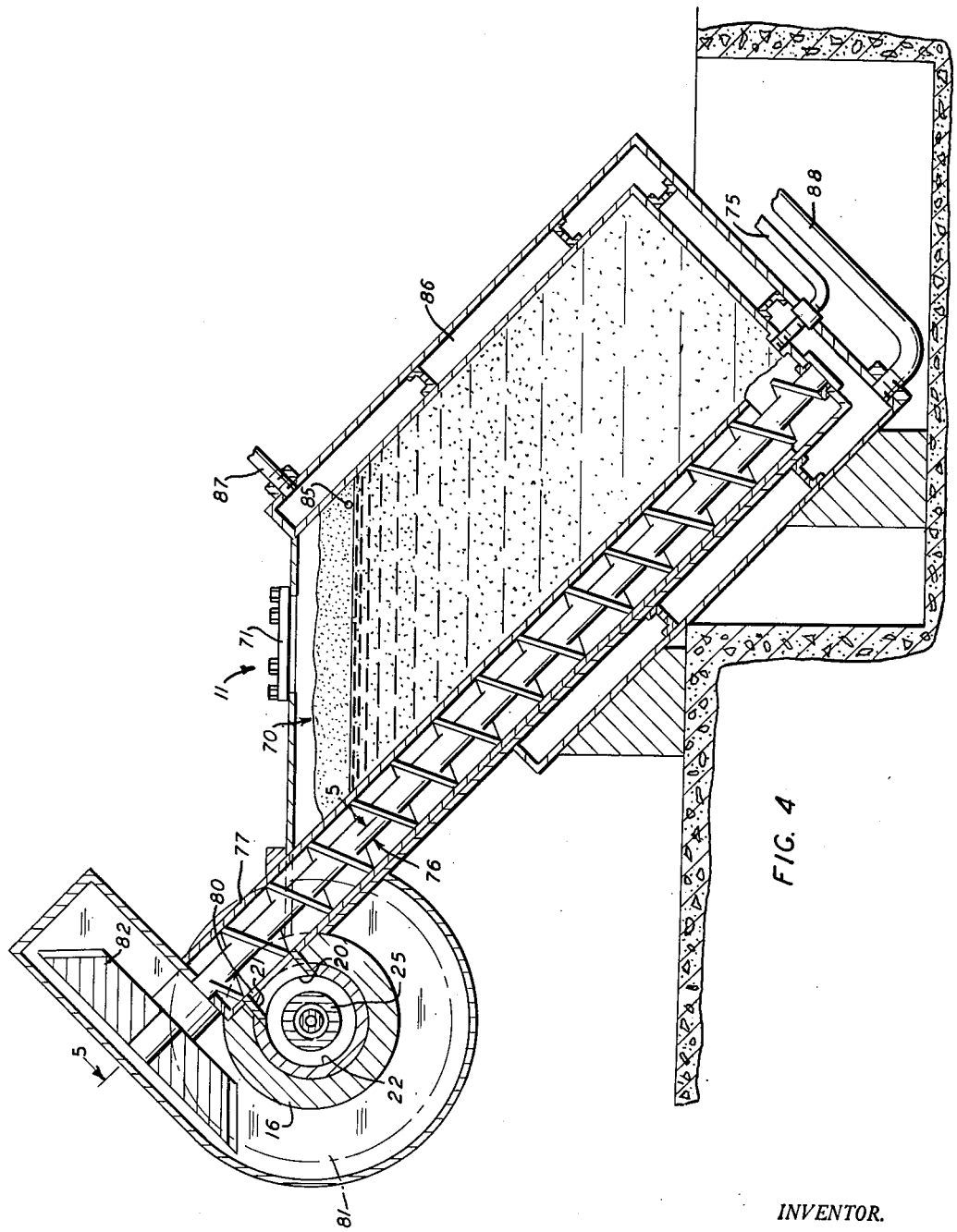
FIG. 4 is an enlarged, vertical section taken along line 4—4 of FIG. 2.

Referring now in detail to the drawings, polyethylene, or another suitable thermoplastic compound is fed into the entrance end of an extruder, indicated generally at 10 (FIG. 1), from a gas tight chamber 11. The plastic compound may be initially in the form of granules, pellets or the like, a supply of which is placed into the chamber 11 and treated therein with a liquefied, normally-gaseous expanding medium according to the principles of the invention. The chamber 11 may be of any desired size and configuration and may be, for example, large enough to hold enough plastic compound for a full working day's operations. The extrusion apparatus is designed to form an insulating covering 12 (FIG. 6) of the plastic compound around a filamentary metallic conductor 15, which may be initially bare or may have a textile or other covering thereon.

The extruder 10 includes a jacketed extrusion cylinder 16 (FIGS. 2 and 3) provided with a helical passage 17 therein through which a suitable heat-exchange medium may be circulated during an extrusion operation for the purpose of controlling the temperature of the plastic compound. The extrusion cylinder 16 has a charging opening 20 (FIG. 4) and a passageway 21 at the entrance end thereof, which connect the chamber 11 with a longitudinally-extending, cylindrical extrusion bore 22 formed in the cylinder. The bore 22 is smooth-walled and has a uniform diameter along its entire length. The chamber 11, the passageway 21 and the extrusion bore 22 are interconnected and capable of being sealed to make them gas tight.

Rotatably mounted within the bore 22 is a stock screw 25, having a central bore 26 therein which is open at the entrance end of the stock screw and closed at the discharge end thereof. Positioned within the bore 26 is a longitudinally extending pipe 27 for circulating a suitable heat-exchange medium within the bore for the purpose of controlling the temperature of the stock screw 25.

The stock screw 25 is rotated by an electric motor 30 (FIGS. 1 and 2) through a suitable gear train (not shown) mounted within a housing 31. The gear train driven by the motor 30 is connected to the left end of the stock screw 25, as viewed in FIG. 2. The stock screw forces the plastic compound through the bore 22 and a strainer 35 positioned transversely across the discharge end of the bore, and into an extrusion head, indicated generally at 36. The extrusion head 36 is secured detachably to the discharge end of the extrusion cylinder 16, and includes a tool holder 37 having a tapered opening 40 which forms a continuation of the extrusion bore 22. The tapered opening 40 communicates with an extrusion passage 41 formed in the tool holder 37 transversely with respect to the tapered opening. An annular die holder 42 positioned in the exit end of the passage 41 has a counterbore 45 formed therein in which an extruding die 46 is mounted.

The conductor 15 is advanced continuously from left to right, as viewed in FIG. 1, from a supply reel 50 by means of a conventional capstan 51. The conductor 15 passes through a core tube holder 52 (FIG. 3) and a core tube 55. The core tube 55 guides the conductor 15 through the axial center of the die 46, wherein the conductor is enveloped by the covering 12 of the plastic compound to form an insulated conductor 56. The finished, insulated conductor 56 is taken up on a conventional take-up apparatus including a reel 57.

The stock screw 25 comprises a root 60 about which a single helical flight 61 is formed. The helical flight 61 has a constant external diameter along the entire length of the stock screw 25, which diameter is substantially equal to the diameter of the extrusion bore 22. The helical flight 61 is generally rectangular in cross section and relatively small in width in comparison to its pitch. In effect, it forms two sides of a helical channel 62, which is bounded on the bottom by the root 60 and on the top by the wall of the bore 22.

The depth of the channel 62 is not constant along the length of the stock screw 25 due to a predetermined progressive variation in the diameter of the root 60 (FIGS. 3 and 5). Because of such variation, the left hand portion of the stock screw 25 compacts the plastic compound into a plastic mass 65, and the right hand portion thereof works the material intensely with a shearing action so that there is a constant build-up of pressure and temperature within the plastic mass.

The temperature of the plastic mass 65 may be controlled, if necessary, by the circulation of suitable heat-exchange media within the passage 17 in the cylinder 16 and the pipe 27 in the bore 26 of the stock screw 25. The clearance between the discharge end of the stock screw 25 and the wall of the bore 22 at that end is very small, and by the time the plastic mass 65 has reached that point it is in a viscous fluid state and is under extremely high pressure. This pressure is sufficient to force the plastic mass 65 through the strainer 35 into the extrusion head 36 and out of the die 46, so as to form the covering 12 on the conductor 15 advancing through the die.

In order to cause the covering 12 extruded upon the conductor 15 to be cellular, a liquefied, normally-gaseous expanding medium, one that is gaseous at standard pressure and temperature, such as dichlorodifluoromethane, is introduced into the chamber 11 so that it may be absorbed in the plastic compound. Referring to FIG. 4, the plastic compound is introduced through a charging port 71 into the chamber 11 as granules, pellets or the like, shown generally at 70. The liquefied expanding medium is supplied to the chamber 11 from a pumping and condensing apparatus 72 (FIGS. 1 and 2) through a pipe 75, and is to be absorbed in the plastic compound 70. A screw-type conveyor 76 is positioned at the bottom of the hopper within a cylindrical sleeve 77 for conveying the treated granules 70, that is, the granules having the liquefied expanding medium absorbed therein, to the extrusion cylinder 16.

When the conveying screw 76 is rotated, the treated granules 70 enter the lower end of the sleeve 77, and are conveyed to the bore 22 of the extrusion cylinder 16 through an opening 80 in the upper end of the sleeve, the passageway 21 and the charging opening 20 in the cylinder 16. The conveying screw 76 is rotated by the motor 30 through a pair of hypoid gears 81 and 82, which are secured fixedly to the left end of the stock screw 25 and to the upper end of the conveying screw 76, respectively, as viewed in FIG. 5. Any type of driving means may be provided for rotating the conveying screw 76, but hypoid gears are particularly advantageous since their axes do not intersect. Because of this construction, the conveying screw 76 can convey the treated granules 70 to a point above the extruding screw 25, and the granules can be directed into the cylinder 16 from the top as best shown in FIGS. 4 and 5.

The liquefied expanding medium is forced by the pumps in the pumping and condensing unit 72 into the chamber 11 until the liquefied medium issues from a valve 85 (FIGS. 1 and 2). Since the interior of the chamber 11 is at atmospheric pressure at this time some of the liquefied medium will vaporize and escape through the valve 85. For a gas such as dichlorodifluoromethane, which has a vapor pressure of only 70 p.s.i. gauge at 70° F., the amount of the escaping vapor will be negligible. When the desired amount of the liquefied expanding medium has been introduced, the valve 85 is closed.

As described hereinabove, the treated plastic granules 70 enter the sleeve 77 at the lower end thereof, and the conveyor screw 76 conveys them up the interior of the sleeve. It is necessary then that there be a steady flow of the granules 70 to the bottom of the chamber 11. When the plastic granules 70 consist of polyethylene and the liquefied expanding medium is dichlorodifluoromethane, the granules will tend to float on the liquefied gas because the polyethylene is lighter than the liquefied expanding medium. For example, polyethylene has a specific gravity of 0.92, while the specific gravity of liquid dichlorodifluoromethane is 1.297, that is, the polyethylene granules weigh only 71% as much per unit volume as the liquid dichlorodifluoromethane. Therefore, to prevent any polyethylene granules from floating on the liquid dichlorodifluoromethane, the value 85 should be at such a level that the dichlorodifluoromethane will attain a level after mixing of 71% of the level of the polyethylene granules. With the liquefied medium at this level, no granules 70 will float in the liquid and the granules will be immersed in a body in the resultant pool of the liquid so that they contact the bottom of the chamber in a position adjacent to the end of the sleeve 77 for entrance therein.

In order to increase the rate of absorption of the liquefied expanding medium in the plastic granules 70, a heating chamber 86 is provided around the chamber 11. Since the temperatures necessary to increase the absorptive abilities of the plastic granules are only in the order of 140° F., water at approximately this temperature may be directed through the heating chamber 86 from a suitable heating and recirculating apparatus (not shown). The water is directed into a pipe 87 from the heating and recirculating unit, through the chamber 86 and to a pipe 88, which directs the water back to the recirculating unit for reheating.

OPERATION

In operation, the plastic material 70 is poured into the chamber 11 through the charging port 71 to a predetermined level above the level of the valve 85 which is open at this time. The pumps in the condensing unit 72 are energized to force the liquefied expanding medium into the chamber 11 through the pipe 75 to the level of the valve 85. When the liquefied medium reaches such level, the valve 85 is closed and the pressure within the chamber 11 will rise to the vapor pressure of the liquefied expanding medium. Heated water is then circulated through the heating chamber 86 to heat the plastic material 70 to a temperature of approximately 140° F. in the case of polyethylene to increase its ability to absorb the liquefied medium.

After the plastic material 70 has been allowed to soak in the liquefied medium for a predetermined length of time, the motor 30 is energized to rotate the stock screw 25 and the conveying screw 76. This soaking time is determined from the desired characteristics of the final extruded product. Factors to take into account include the type of plastic material and the liquefied expanding medium used and the temperature to which these materials are heated. The longer the granules are allowed to soak and the higher the temperature to which they are heated, the greater will be the penetration of the liquefied expanding medium into the granules.

When the motor 30 is energized after this predetermined soaking time, the conveying screw 76 conveys the treated plastic granules 70 up the sleeve 77. From the sleeve 77, the treated granules fall through the opening 80 in the sleeve 77, the passageway 21, the charging opening 20 and into the extrusion bore 22 of the cylinder 16. The granules are then constantly worked with a kneading and shearing action as they are advanced by the stock screw 25, so that the plastic mass 65 is formed. The expanding medium absorbed in the plastic mass 65 is worked into and thoroughly intermingled with the plastic material by the time the resulting mixture reaches the discharge end of the stock screw 25. Since the plastic mass 65 is in a viscous liquid state as it progresses along the stock screw 25 near the discharge end thereof, the expanding medium intermingles freely therewith so that a homogeneous mixture thereof with the plastic mass results.

The pressure within the extrusion cylinder 16 is sufficiently high to prevent the entrapped medium from expanding the plastic mass 65 until it emerges from the extrusion head in the form of the covering 12 on the conductor 15, even though the temperature of the plastic mass may be of the order of several hundred degrees F. in the case of polyethylene. Since the left hand portion of the stock screw 25 causes the granules to be compacted tightly, none of the plastic mass 65 escapes through the entrance end of the cylinder 16. As soon as the insulated conductor 56 emerges from the extruding die 46 into the atmosphere, the pressure thereon is released suddenly. As a result, the expanding medium, which is at a high temperature and is entrapped in the plastic under high pressure, expands instantly and converts the covering 12 into a cellular product, such as is shown in FIG. 6. As is shown there, the conductor 15 is covered with a concentric covering 12 consisting of the plastic material containing a plurality of small, discrete and uniformly-distributed cells of the gaseous material entrapped therein. Because of the cellular state of the finished covering 12, its physical properties are very desirable, and insulated conductors, like the conductor 56, are particularly useful for numerous purposes, such as elements of communication systems.

As described hereinbefore, the chamber 11 was filled originally with the plastic granules 70 to a predetermined level. Also, the liquefied expanding medium was injected into the chamber 11 to a level somewhat below the predetermined level of the plastic material 70. This is necessary since the density of the plastic material is less than the specific gravity of the liquefied medium. Therefore, as the screw conveyor 76 conveys the plastic granules 70 treated with the medium to the extrusion cylinder 16 and the level of the treated granules 70 decreases, the body of granules remaining in the liquid pool will float therein if the level of the granules is decreased below the predetermined ratio. For example, when polyethylene and dichlorodifluoromethane are used, the level of the dichlorodifluoromethane should always be less than 71% of the level of the polyethylene. If it is any greater, the body of granules will float and the floating granules will not enter the lower end of the sleeve 77.

One way to prevent floating of the polyethylene granules in the dichlorodifluoromethane is to decrease the level of the dichlorodifluoromethane by an amount equal to the decreasing level of the granules, that is, to counterbalance the amount of granules withdrawn by maintaining the level of the liquid dichlorodifluoromethane at 71% of the level of the polyethylene. To decrease the level of the liquefied expanding medium, it is only necessary to withdraw it from the chamber 11 by actuating the pumps in the condensing unit 72 to withdraw a counterbalancing side stream of the liquid through the pipe 75. By maintaining the difference between the levels of the liquefied medium and plastic granules constant, the treated granules will always be positioned at the lower end of the chamber 11.

When the treated granules 70 within the chamber 11 have been exhausted, the expanding medium, both liquid and vapor, is withdrawn from the chamber 11 by pumps in the condensing and pumping unit 72. Since some of the plastic granules 70 were above the level of the liquefied medium, this material will remain in the chamber 11 for further treatment. Any pressure within the chamber 11 is exhausted by opening the valve 85. Thereafter the charging port 71 may be opened and a fresh charge of plastic granules 70 introduced therein.

*Alternative embodiment*

There is shown in FIGS. 7 and 8 an alternative apparatus for preventing the plastic material from floating on the surface of the less dense liquefied medium. In this embodiment of the invention, a follower 190 is mounted for slidable movement within a chamber 111. The cross sections of the chamber 111 and the follower 190 may, of course, be of any desired matching configuration, and are shown to be circular in FIGS. 7 and 8. Plastic material, such as polyethylene, in the form of granules, pellets or the like, is charged through a charging port 171 and a liquefied expanding medium is supplied to the chamber 111 through a supply pipe 175.

To keep the plastic granules submerged beneath the level of the liquefied medium, the follower 190 is allowed to slide down the interior of the chamber 111 and force any of the floating plastic granules below the surface of the liquefied medium. The fitting between the follower 190 and the interior of the chamber 111 must be sufficiently small to prevent any granules from passing therebetween, but sufficiently large to permit the liquefied expanding medium to pass therethrough and maintain its own level.

After a charge of the plastic granules has been withdrawn from the chamber 111, the follower 190 is raised to its upper level, as shown in solid lines in FIG. 7, by rotating a reel 191 to which the follower 190 is connected by a flexible member, such as a chain 192. A shaft 195, which supports the reel 191 rotatably, extends through the chamber 111 and is secured rotatably within a suitable gland 196 so that no vapor passes therethrough.

After the plastic granules have been withdrawn from the chamber 111, the follower 190 will be positioned near the lower end of the chamber 111, as shown in phantom lines in FIG. 7. A hand crank 197 secured to the exposed end of the shaft 195 is rotated to wind the chain 192 upon the reel 191 and to bring the follower 190 to its highest position within the chamber 111. A fresh charge of the plastic granules is then introduced into the chamber 111 through the charging port 171, which is located below the position of the follower 190 at this time. Since the follower 190 will keep the plastic granules below the level of the liquefied medium, there is no need of a valve like the valve 85 shown in FIGS. 1 and 2. Also, the liquefied medium is not withdrawn from the chamber 111 as the plastic granules are conveyed to the extruder and the level of the medium depends solely upon the amount absorbed by the plastic granules.

While in the foregoing description polyethylene has been mentioned as the plastic material employed to produce cellular plastic products, this invention is not restricted to the use of polyethylene as the plastic material. Instead of polyethylene, polyvinyl halide compounds, copolymers of vinyl chloride and vinyl acetate, nylon or other suitable thermoplastic materials may be used to form cellular plastic products, such as conductors insulated with cellular insulation.

Dichlorodifluoromethane has been mentioned as one form of expanding medium that might be used to produce cellular plastic products. In addition, other media that may be used are chlorodifluoromethane, dichlorofluoromethane, dichlorotetrafluoroethane, difluorochloroethane, 1,1-difluoroethane, trichlorofluoromethane, ethyl chloride, methyl bromide and methyl chloride. Other normally-gaseous compounds that may be employed are acetylene, ammonia, butadiene, butane, butene, carbon dioxide, cyclopropane, dimethylamine, 2,2-dimethylpropane, ethane, ethylamine, ethylene, isobutane, isobutylene, methane, monomethylamine, propane, propylene and trimethylamine.

All of the aforementioned materials are intended to be embraced within the term "normally-gaseous expanding medium," as used herein and in the annexed claims. This term is intended to mean that the expanding medium employed is a gas at the temperatures existing under the normal operating conditions of a plastics extruder. It also is meant to include one that is easily liquefied and capable of being heated to a temperature that will increase its absorption in the plastic material, with such temperature being considerably below the critical temperature of the gas.

While in the foregoing description, specific reference has been made to two types of apparatus by means of which methods embodying the invention may be practiced, other forms of apparatus suitable for the purpose of the invention may be devised and utilized by persons skilled in the art without departing from the spirit and scope of the invention.

What is claimed is:

1. A method of making expandable plastic materials, which comprises introducing granules of an extrudable solid organic thermoplastic compound selected from the groups consisting of polyethylene, polyvinyl chloride and copolymers of vinyl chloride and vinyl acetate into a treating zone, introducing into the treating zone a liquefied, normally gaseous expanding medium to be absorbed into the granules of the thermoplastic compound, said treating zone being sealed to the atmosphere, said liquefied expanding medium being selected from the group consisting of dichlorodifluoromethane, chlorodifluoromethane, dichlorofluoromethane, dichlorotetrafluoroethane, difluorochloroethane, 1,1-difluoroethane, and trichlorofluoromethane and having a specific gravity greater than the specific gravity of the granules of the thermoplastic compound, the level of the liquefied expanding medium introduced into the treating zone being sufficiently less than the level of the granules of the thermoplastic compound so that the granules of the thermoplastic compound will rest at the bottom of the treating zone rather than floating in the liquefied expanding medium, heating the treating zone containing the granules of the thermoplastic compound and the liquefied expanding medium to a temperature below the critical temperature of the liquefied expanding medium to increase the rate of absorption of the liquefied expanding medium by the granules of the thermoplastic compound, allowing the granules of the thermoplastic compound to soak in the expanding medium until the desired amount of liquefied expanding medium has been absorbed by the granules of thermoplastic compound, withdrawing the granules of the thermoplastic compound soaked with the desired amount of the liquefied expanding medium from the bottom of the zone while preventing exposure of the soaked granules of the thermoplastic compound to the atmosphere, and withdrawing a sufficient amount of the liquefied expanding medium from the zone while removing the soaked granules of the thermoplastic compound therefrom so that the difference in the level of the granules of the thermoplastic compound and the level of the liquefied expanding medium remaining in the zone is sufficient to maintain the granules of the thermoplastic compound at rest at the bottom of the treating zone rather than floating in the liquefied expanding medium.

2. The method in accordance with claim 1, wherein the thermoplastic compound is polyethylene.

3. A method of making cellular plastic products, which comprises introducing granules of an extrudable solid organic thermoplastic compound selected from the groups consisting of polyethylene, polyvinyl chloride and copolymers of vinyl chloride and vinyl acetate into a treating zone, introducing into the treating zone a liquefied, normally gaseous expanding medium to be absorbed into the granules of the thermoplastic compound, said treating zone being sealed to the atmosphere, said liquefied expanding medium being selected from the group consisting of dichlorodifluoromethane, chlorodifluoromethane, dichlorofluoromethane, dichlorotetrafluoroethane, difluorochloroethane, 1,1-difluoroethane, and trichlorofluoromethane and having a specific gravity greater than the specific gravity of the granules of the thermoplastic compound, the level of the liquefied expanding medium introduced into the treating zone being sufficiently less than the level of the granules of the thermoplastic compound so that the granules of the thermoplastic compound will rest at the bottom of the treating zone rather than floating in the liquefied expanding medium, heating the treating zone containing the granules of the thermoplastic compound and the liquefied expanding medium to a temperature below the critical temperature of the liquefied expanding medium to increase the rate of absorption of the liquefied expanding medium by the granules of the thermoplastic compound, allowing the granules of the thermoplastic compound to soak in the expanding medium until the desired amount of liquefied expanding medium has been absorbed by the granules of thermoplastic compound, withdrawing the granules of the thermoplastic compound soaked with the desired amount of the liquefied expanding medium from the bottom of the zone while preventing exposure of the soaked granules of the thermoplastic compound to the atmosphere, withdrawing a sufficient amount of the liquefied expanding medium from the zone while removing the soaked granules of the thermoplastic compound therefrom so that the difference in the level of the granules of the thermoplastic compound and the level of the liquefied expanding medium remaining in the zone is sufficient to maintain the granules of the thermoplastic compound at rest at the bottom of the treating zone rather than floating in the liquefied expanding medium, advancing the treated compound along a working and mixing zone while causing the treated thermoplastic compound to be kneaded and sheared under sufficiently high pressure to prevent the entrapped expanding medium from expanding so that the expanding medium absorbed in the thermoplastic compound is worked into and thoroughly intermingled with the thermoplastic compound to form a homogeneous mixture, extruding the worked and mixed thermoplastic compound having liquefied expanding medium therein into a desired shaped an releasing the pressure on the extruded, worked and mixed thermoplastic compound having liquefied expanding medium therein so that the entrapped liquefied expanding medium is converted to a gaseous state and expands the extruded thermoplastic compound into a cellular product having plurality of small discrete cells with gaseous expanding medium entrapped therein.

4. The method in accordance with claim 3, wherein the thermoplastic compound is polyethylene.

References Cited in the file of this patent

UNITED STATES PATENTS

| | | |
|---|---|---|
| 2,256,483 | Johnston | Sept. 23, 1941 |
| 2,409,910 | Stober | Oct. 22, 1946 |
| 2,430,641 | McKenzie et al. | Nov. 11, 1947 |
| 2,468,060 | Gunnell | Apr. 26, 1949 |
| 2,515,250 | McIntire | July 18, 1950 |
| 2,641,799 | McDonald et al. | June 16, 1953 |
| 2,713,347 | Hazy | July 19, 1955 |
| 2,766,481 | Henning | Oct. 16, 1956 |
| 2,774,991 | McCurdy et al. | Dec. 25, 1956 |
| 2,779,062 | Stastny | Jan. 29, 1957 |
| 2,784,725 | Williams | Mar. 12, 1957 |
| 2,785,455 | McElroy | Mar. 19, 1957 |

FOREIGN PATENTS

| | | |
|---|---|---|
| 1,081,583 | France | June 9, 1954 |

OTHER REFERENCES

Higgins: "Cellular Polyethylene by Extrusion," Plastics Engineering, March 1954, pages 90, 100, 102, and 104.